United States Patent
Lee et al.

(10) Patent No.: US 9,338,433 B2
(45) Date of Patent: May 10, 2016

(54) METHOD AND ELECTRONIC DEVICE FOR DISPLAYING A 3D IMAGE USING 2D IMAGE

(75) Inventors: Jong-min Lee, Uiwang-si (KR); Hee Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 609 days.

(21) Appl. No.: 13/233,733

(22) Filed: Sep. 15, 2011

(65) Prior Publication Data

US 2012/0063740 A1    Mar. 15, 2012

(30) Foreign Application Priority Data

Sep. 15, 2010    (KR) .................. 10-2010-0090661

(51) Int. Cl.
  *H04N 13/02*    (2006.01)

(52) U.S. Cl.
  CPC .......... *H04N 13/02* (2013.01); *H04N 2213/006* (2013.01)

(58) Field of Classification Search
  CPC ................ H04N 13/02; H04N 2213/006
  USPC ........................................ 386/230
  See application file for complete search history.

(56) References Cited

U.S. PATENT DOCUMENTS

| | | | |
|---|---|---|---|
| 2009/0066786 A1* | 3/2009 | Landa ............................. | 348/54 |
| 2009/0169182 A1* | 7/2009 | Kawabata et al. ............. | 386/124 |
| 2010/0060475 A1* | 3/2010 | Choi .............................. | 340/689 |
| 2010/0064259 A1 | 3/2010 | Alexanderovitc et al. | |
| 2010/0131904 A1* | 5/2010 | Fong et al. .................... | 715/863 |
| 2010/0295958 A1* | 11/2010 | Larsson et al. ............. | 348/222.1 |
| 2012/0036433 A1* | 2/2012 | Zimmer et al. ............... | 715/702 |

FOREIGN PATENT DOCUMENTS

KR    1020100030273    3/2010

* cited by examiner

*Primary Examiner* — Mohammed Rahaman
(74) *Attorney, Agent, or Firm* — The Farrell Law Firm, P.C.

(57) ABSTRACT

A method and apparatus are provided for displaying a 3D image using a 2D image in an electronic device. Information related to an inclination of the electronic device is detected from a motion of the electronic device. The 3D image is generated by moving each of a plurality of image layers, which are derived from the 2D image, based on the detected information and motion parallax corresponding to the detected information. The 3D image is displayed.

18 Claims, 13 Drawing Sheets

METHOD AND ELECTRONIC DEVICE FOR DISPLAYING A 3D IMAGE USING 2D IMAGE

PRIORITY

This application claims priority under 35 U.S.C. §119(a) to Korean Patent Application No. 10-2010-0090661, filed on Sep. 15, 2010, in the Korean Intellectual Property Office, the disclosure of which is incorporated herein by reference.

BACKGROUND OF THE INVENTION

1. Field of the Invention

The present invention relates generally to a method and an electronic device for displaying a 3-Dimensional (3D) image, and more particularly, to a method and an electronic device for displaying a 3D image using a 2-Dimensional (2D) image based on motion parallax.

2. Description of the Related Art

Current market trends place great importance on pleasing the visual senses of users. Thus, a variety of screens for electronic devices have been provided. However, 2D screens in conventional electronic devices provide limited effects that are restrictive in attracting users. 3D screens can be used to construct an attractive display. A conventional electronic device uses 3D-exclusive software to generate a 3D image. Specifically, the 3D-exclusive software requires a complicated polygon calculation. However, these screens have not been appropriate for electronic devices due to their high power consumption and high software complexity.

SUMMARY OF THE INVENTION

The present invention has been made to address at least the above problems and/or disadvantages and to provide at least the advantages described below. Accordingly, an aspect of the present invention provides a method and an electronic device for displaying a 3D image using a 2D image, and a computer-readable recording medium having recorded thereon a computer program for executing the method.

According to an aspect of the present invention, a method is provided for displaying a 3D image using a 2D image in an electronic device. Information related to an inclination of the electronic device is detected from a motion of the electronic device. The 3D image is generated by moving each of a plurality of image layers, which are derived from the 2D image, based on the detected information and motion parallax corresponding to the detected information. The 3D image is displayed.

According to another aspect of the present invention, an electronic device is provided for displaying a 3D image using a 2D image. The electronic device includes a motion detection unit for detecting information related to an inclination of the electronic device from a motion of the electronic device. The electronic device also includes a processing unit for generating the 3D image by moving each of a plurality of image layers, which are derived from the 2D image, based on the detected information and motion parallax corresponding to the detected information. The electronic device further includes a display unit for displaying the 3D image.

According to another aspect of the present invention, a computer-readable recording medium is provided having recorded thereon a computer program for executing the steps of: detecting information related to an inclination of an electronic device from a motion of the electronic device; generating a 3-Dimensional (3D) image by moving each of a plurality of image layers, which are derived from a 2-Dimensional (2D) image, based on the detected information and motion parallax corresponding to the detected information; and displaying the 3D image.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1:
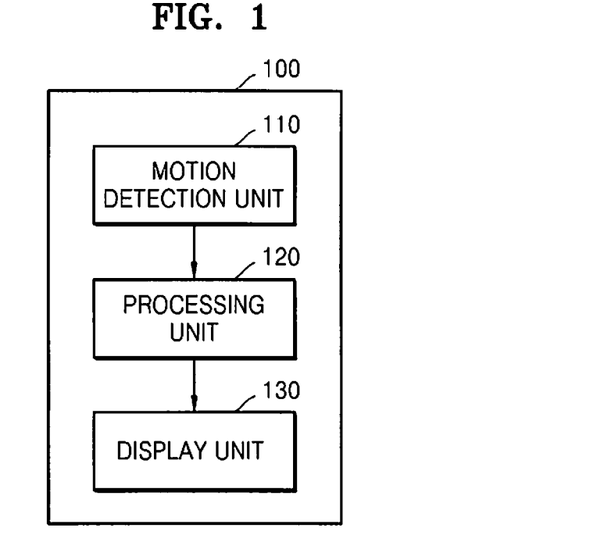
FIG. 1 is a block diagram illustrating an electronic device, according to an embodiment of the present invention.

FIG. 1 is a block diagram illustrating an electronic device 100, according to an embodiment of the present invention. The electronic device 100 may be a mobile phone, a Personal Digital Assistant (PDA), a still camera, a video camera, a portable calculator, a portable radio, a music or video player, a digital thermometer, a game machine, a portable electronic apparatus, a watch, or any other handheld or portable apparatus.

Referring to FIG. 1, the electronic device 100 includes a motion detection unit 110, a processing unit 120, and a display unit 130.

The motion detection unit 110 detects inclination information from a motion of the electronic device 100. The inclination information is information related to the inclination of the electronic device 100. If a stationary position of the electronic device 100 is set as a reference coordinate value, the inclination information may include a distance moved and a direction of rotation of the electronic device 100 from the reference coordinate value, in the x, y, and z axes. Specifically, the inclination information includes both an inclination angle and an inclination direction. For example, the motion detection unit 110 may include a 3-axis acceleration sensor. However, the motion detection unit 110 is not limited thereto, and may include any sensor capable of detecting the inclination information from a motion of the electronic device 100.

An angle sensed by the 3-axis acceleration sensor has three values in the x, y, and z axes. The direction and amount of inclination of the electronic device 100 may be calculated based on the three values. The calculation of the direction and inclination amount is performed by using a position of the electronic device, at which a screen of the display unit 130 becomes visible to a user, as a reference value. The direction and amount of inclination of the movement of the electronic device 100 is calculated by comparing the inclination information detected by the 3-axis acceleration sensor in the x, y, and z axes to the reference value. For example, from values of x: 10, y: 0, and Z: 0, it may be determined that the electronic device 100 is inclined in a right direction by 10°.

The processing unit 120 may be a microprocessor, a controller, or any other appropriate computing apparatus or resource. The processing unit 120 is configured to execute various computer commands in various computer languages so as to realize functions available in the electronic device 100. The processing unit 120 may include all controllers appropriate to manage and control operations of the electronic device 100.

The processing unit 120 generates a 3D image by moving each of a plurality of image layers, derived from a 2D image, based on the inclination information and motion parallax corresponding to the inclination information.

The generation of the plurality of image layers by the processing unit 120 is described in detail below. Initially, the processing unit 120 generates a plurality of layers for constructing the 3D image. The processing unit 120 divides the 2D image into a plurality of sub-images, according to a difference in perceived distance between an observer of the 2D image and content of each of sub-images, in order to provide a 3D effect. The image layers are generated by displaying the divided sub-images separately on respective ones of the plurality of layers. The image layers may be generated when a motion event occurs in the electronic device 100, or may be generated in advance. The processing unit 120 shifts each of the image layers in a direction opposite that of the rotation of the electronic device 100, which is detected by the motion detection unit 110. For example, if the electronic device 100 is inclined toward the right, each of the image layers may be shifted toward the left.

The principal of motion parallax used by the processing unit 120 is described in detail below. Motion parallax refers to a phenomenon in which a nearby object moves quickly while a far-off object moves slowly when an observer of the objects moves. Generally, motion parallax assumes that an observer moves in a parallel direction. However, if an observer rotates on a defined point, a far-off object moves quickly while a nearby object moves slowly. Embodiments of the present invention utilize this rotational motion parallax phenomenon. Accordingly, the processing unit 120 achieves a 3D effect by applying motion parallax to each of the generated image layers. Specifically, the processing unit 120 is configured to set a distance that each of the image layers is shifted in proportion to a difference in perceived distance between an observer of the image and content of each of the image layers. More specifically, content in a top image layer is perceived as closer to an observer than content in a bottom image layer. For example, if an image layer 1 is shifted an amount that is double that of an image layer 2 according to a variation in inclination of the electronic device 100, a perceived distance of the content of image layer 1 from an observer of the image is double that of the content of image layer 2. However, the differences in shifting distance and distance from the observer are not limited to a specific range of values. The processing unit 120 achieves a 3D effect by applying motion parallax such that image layers are shifted different distances according to a difference in perceived distance from an observer of the image. A difference in shifting distance between layers is proportional to a difference in observer perceived distance between content in the layers.

The processing unit 120 is also configured to set a threshold value for a width of shifting movement for each of the image layers. Specifically, the width of shifting movement of each image layer is fixed and the amount of motion may vary according to the detected inclination angle. If the inclination angle is increased, the amount of motion is also increased.

The display unit 130 displays the 3D screen.

According to another embodiment of the present invention, some components illustrated in FIG. 1 may not be included in the electronic device 100. It should also be noted that the electronic device 100 may include additional components that are not illustrated in FIG. 1.

The electronic device 100 shifts the image layers by different amounts in accordance with motion parallax. Thus, the electronic device 100 visually constructs the 3D image. However, the amount that each image layer is shifted may vary according to the inclination angle detected by the motion detection unit 110. The electronic device 100 determines a direction of inclination of the electronic device 100 using the motion detection unit 110, and visually constructs the 3D image by shifting the image layers in a direction opposite that of the inclination.

Accordingly, the electronic device 100 realizes a 3D effect without performing a complicated 3D calculation.

Since additional 3D-exclusive software is not used in the embodiments of the present invention, and a 3D screen is visually constructed using a plurality of 2D image layers instead, the electronic device 100 consumes less power, requires fewer calculations, and has a high speed.

Use of the electronic device 100 is described in detail below with reference to FIGS. 2A, 2B, 3A, 3B, 4A, 4B, 5A through 5D, 6A through 6C, and 7A through 7C. However, use of the electronic device 100 is not limited to these embodiments of the present invention.

FIGS. 2A, 2B, 3A, 3B, 4A and 4B are diagrams illustrating a method of constructing a 3D image of a menu screen using a 2D image in the electronic device 100 of FIG. 1, according to an embodiment of the present invention.

Figure 2A:
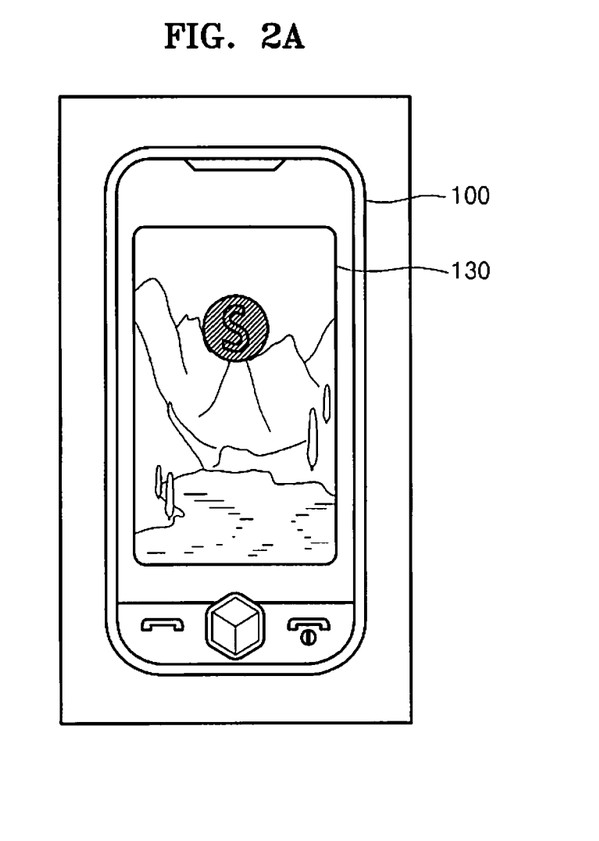
FIGS. 2A and 2B, 3A and 3B, and 4A and 4B are diagrams illustrating a method of displaying a 3D image of a menu screen using a 2D image in the electronic device of FIG. 1, according to an embodiment of the present invention.
Figure 2B:
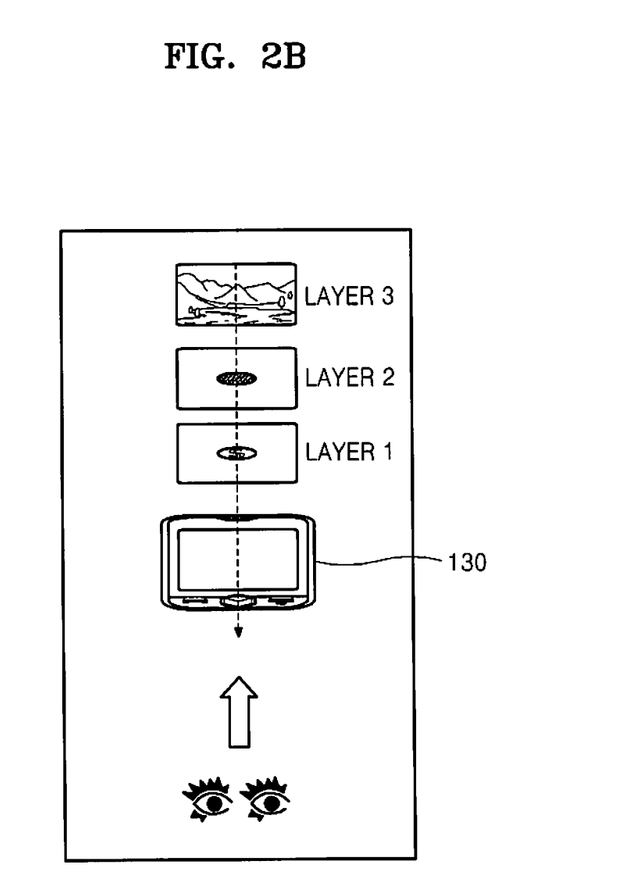

FIGS. 2A and 2B are diagrams illustrating a method of generating a plurality of image layers, according to an embodiment of the present invention.

FIG. 2A shows a 3D image of a menu screen on a display unit 130 before a motion event occurs in the electronic device 100. The 3D image of the menu screen is initially presented to a user when using the electronic device 100 in order to execute an application. A desired application may be selected for execution by clicking or dragging the image.

Referring to FIG. 2B, a layer 1, a layer 2, and a layer 3 are aligned for construction of the 3D image of the menu screen. The 2D image is divided into a menu icon image, a shadow image of the menu icon image, and a background image, according to desired perceived distances from an observer of the image. The images are each attributed to a different layer, resulting in a menu icon image layer 1, a shadow image layer 2, and a background image layer 3.

The shadow image may be generated by, for example, copying and reducing a chroma level of the menu icon image. However, the method of generating the shadow image is not limited thereto. Since a bright object is regarded as being nearby and relative positions between two objects are sensed due to light and shadow, the electronic device 100 may achieve a greater 3D effect by using the shadow image.

A plurality of image layers may be generated after a motion event occurs in the electronic device 100. However, the generation of the image layers is not limited to this event.

Figure 3A:
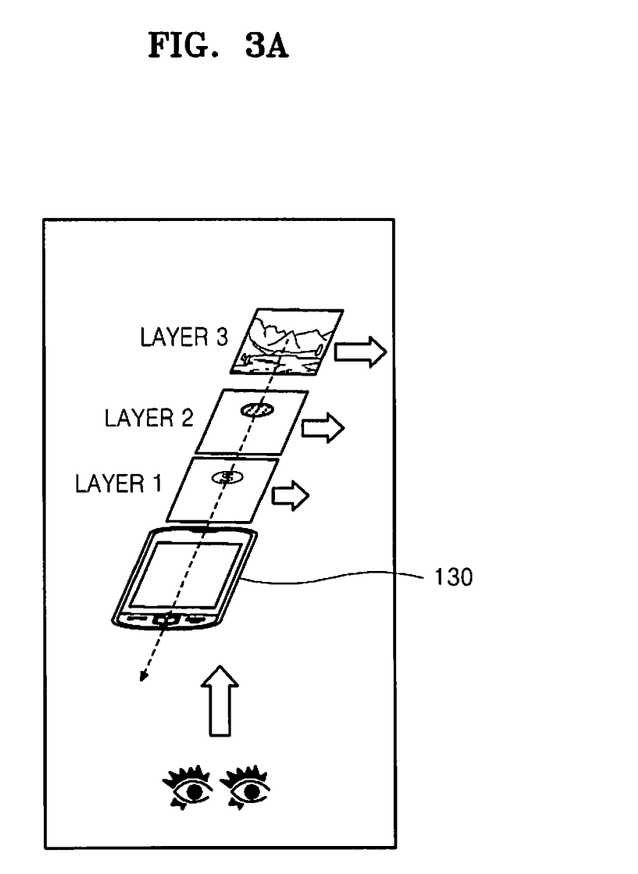
Figure 3B:
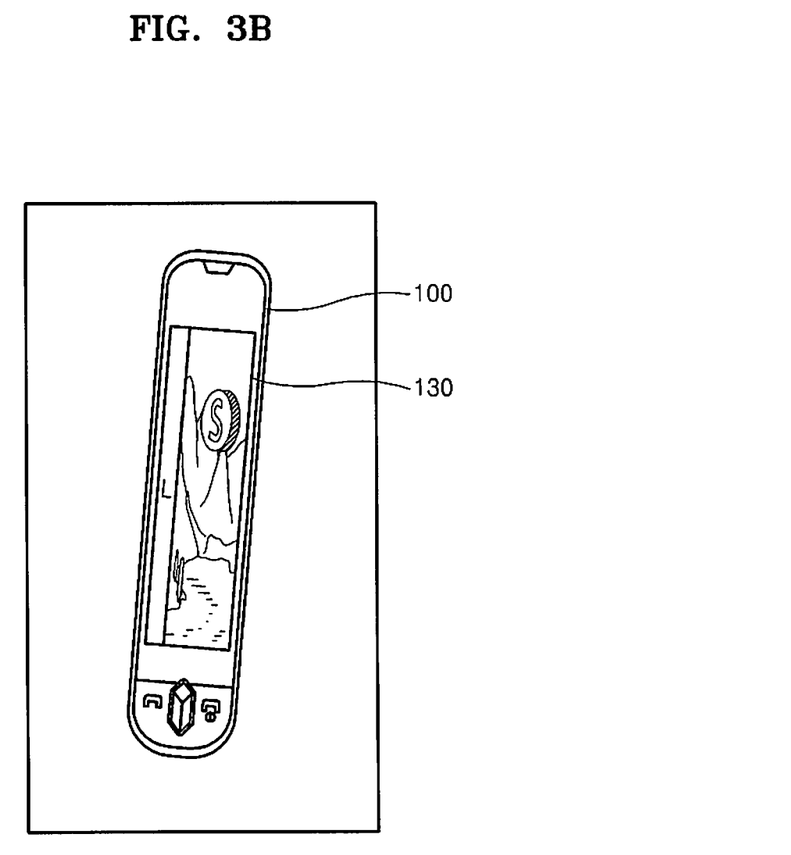

FIGS. 3A and 3B show the 3D image of a menu screen after motion parallax is applied when a user inclines the electronic device 100 in a predetermined angle toward the left, according to an embodiment of the present invention.

Referring to FIG. 3A, the processing unit 120 sets distances shifted for the menu icon image layer 1, the shadow image layer 2, and the background image layer 3 in proportional to their respective perceived distances from an observer. For example, if the menu icon image layer 1 (or top layer) shift by a value of 1, the shadow image layer 2 (or middle layer) and the background image layer 3 (or bottom layer) may respectively shift by a value of 1.7 and a value of 2. Further, if the menu icon image layer 1 shifts toward the right by 10 pixels, the shadow image layer 2 may shift toward the right by 17 pixels and the background image layer 3 may shift toward the right by 20 pixels.

The width that each image layer can shift may be fixed. For example, a range of motion of each image layer may not exceed 100 pixels in one direction.

A shifting direction of each image layer is toward the right, which is opposite to the direction of inclination of the electronic device 100.

As a result, referring to FIG. 3B, the 3D menu screen is displayed on the display unit 130.

Since the width that each image layer can shift is fixed and only display positions of 2D image layers are changed, a menu may also be selected and operated on the 3D image of the menu screen.

As illustrated in FIG. 3B, a new region may be viewed. For example, since the size of the background image layer is greater than the size of the menu icon image layer by several pixels, the new region may be a portion of the background image layer, which becomes visible when each image layer shifts a certain distance. However, the new region is not limited thereto and may be an image of a new layer under the background image layer. The new region visible on the 3D menu screen when a motion event occurs in the electronic device 100 may be a left region L, a right region R, a top region T, or a bottom region B.

Figure 4A:
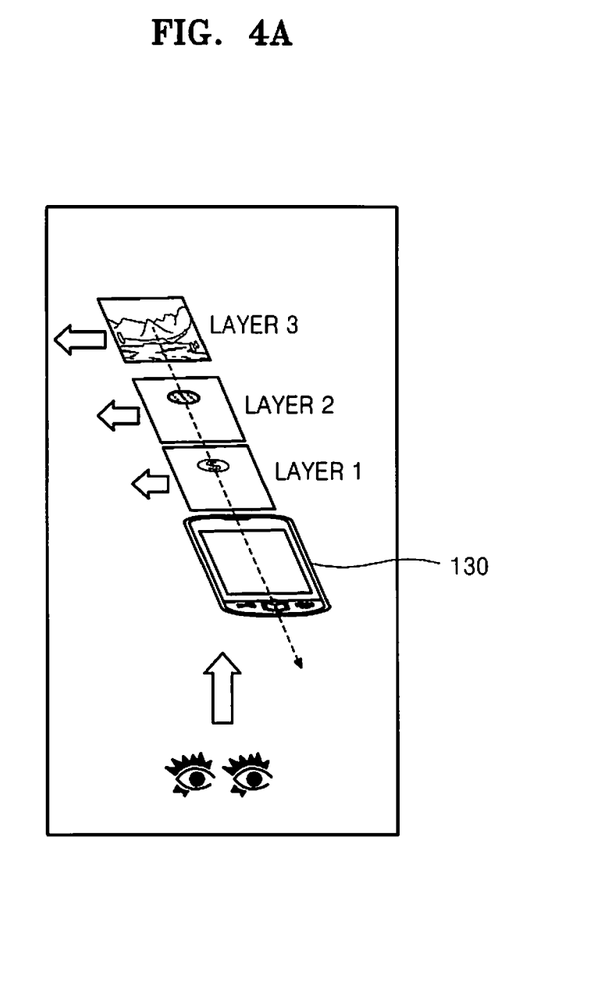
Figure 4B:
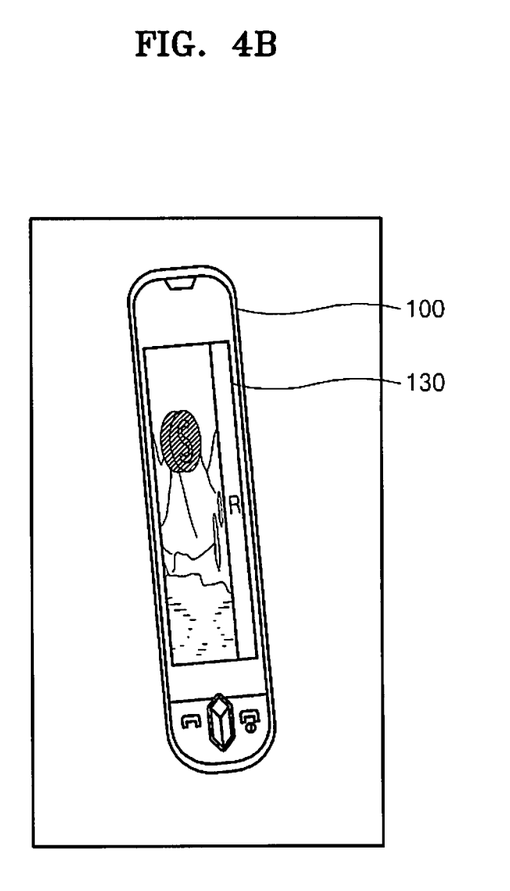

FIGS. 4A and 4B show the 3D image of the menu screen after motion parallax is applied when a user inclines the electronic device 100 toward the right by a predetermined angle, according to an embodiment of the present invention. A shifting direction of each image layer is toward the left, which is opposite to the inclination direction of the electronic device 100. Although the shifting direction is different, the shifting distance is the same as that of FIGS. 3A and 3B.

FIGS. 5A through 5D are diagrams illustrating a method of constructing a 3D image of a menu screen using a 2D image in the electronic device 100 of FIG. 1, according to another embodiment of the present invention. The method of FIGS. 5A through 5D is similar to that of FIGS. 2A, 2B, 3A, 3B, 4A and 4B.

Figure 5A:
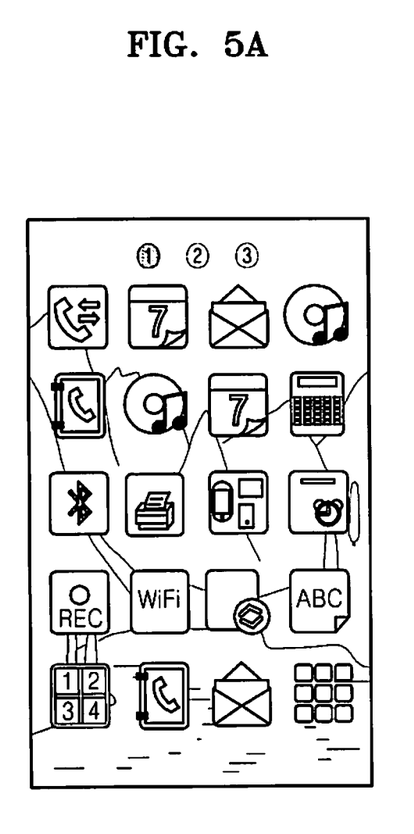
FIGS. 5A through 5D are diagrams illustrating a method of displaying a 3D image of a menu screen using a 2D image in the electronic device of FIG. 1, according to another embodiment of the present invention.

FIG. 5A shows the 3D image of the menu screen before a motion event occurs in the electronic device 100.

Figure 5B:
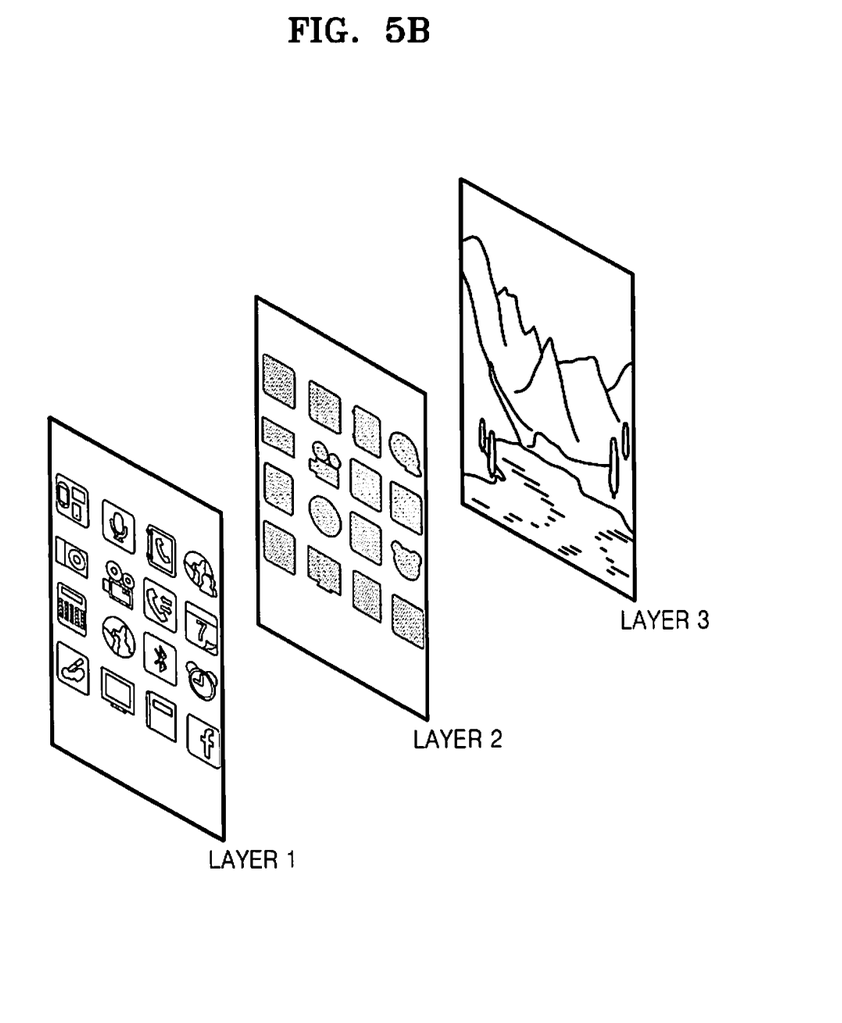

Referring to FIG. 5B, a layer 1, a layer 2, and a layer 3 for constructing the 3D menu screen are aligned. The 2D image is divided into a menu icon image, a shadow image of the menu icon image, and a background image according to desired perceived distances from an observer in order to provide a 3D effect for the 2D image. The images are each attributed to a different layer, resulting in a menu icon image layer 1, a shadow image layer 2, and a background image layer 3.

Figure 5C:
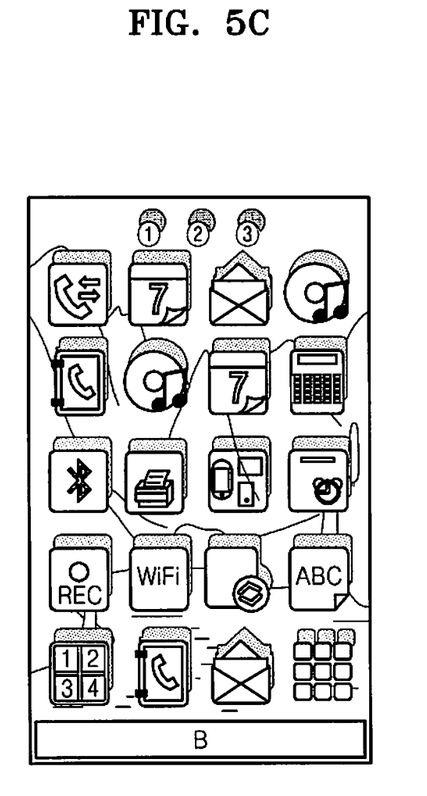

FIG. 5C shows the 3D image of the menu screen after motion parallax is applied, when a user inclines the electronic device 100 downward at a predetermined angle. The user may now view a bottom region B of the 3D menu screen. Similarly, the electronic device 100 may be inclined upward to view a top region T of the 3D menu screen, toward the right to view a right region R of the 3D menu screen, and toward the left to view a left region L of the 3D menu screen.

Figure 5D:
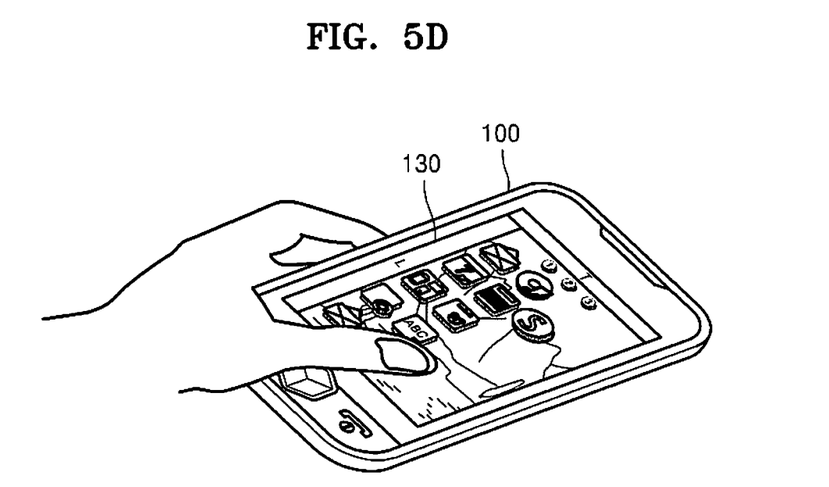

Referring to FIG. 5D, the electronic device 100 may be inclined and the 3D image of the menu screen may be dragged to view a next menu page. Because only display positions of 2D image layers are changed, a menu may still be selected and operated on the 3D image of the menu screen.

Figure 6A:
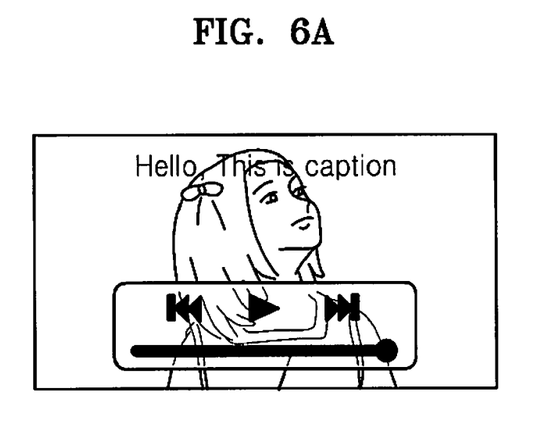
FIGS. 6A through 6C are diagrams illustrating a method of displaying a 3D image of a video player screen using a 2D image in the electronic device of FIG. 1, according to an embodiment of the present invention.
Figure 6B:
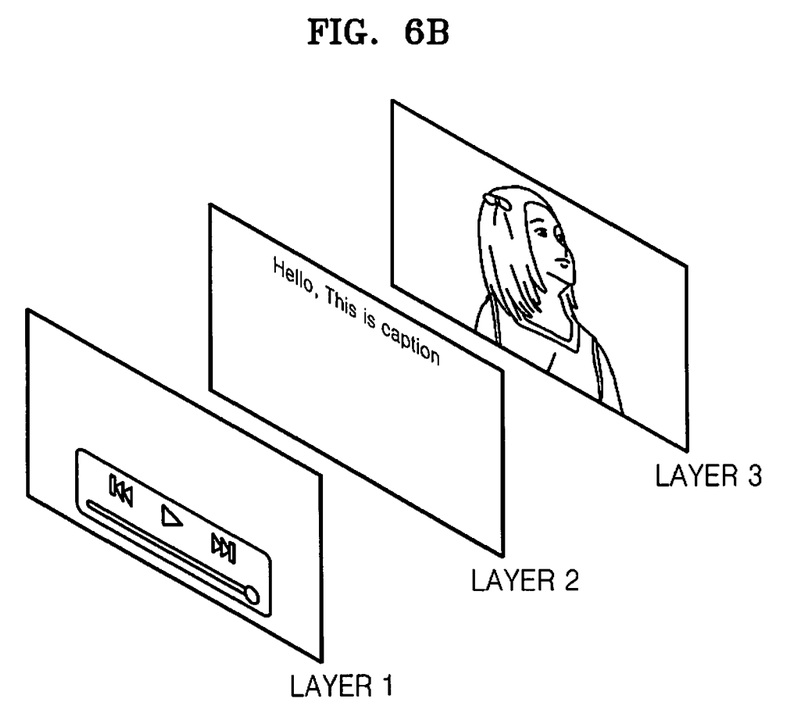
Figure 6C:
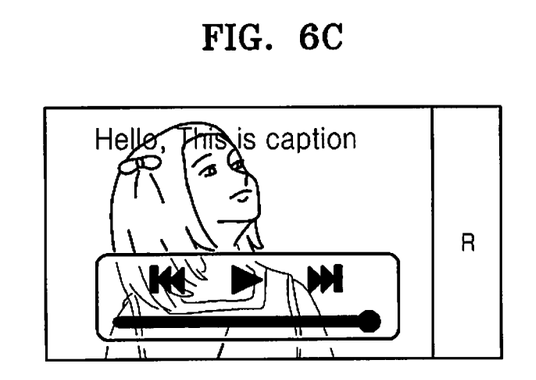

FIGS. 6A through 6C are diagrams illustrating a method of constructing a 3D image of a video player screen using a 2D image in the electronic device 100 of FIG. 1, according to an embodiment of the present invention.

The method illustrated in FIGS. 6A through 6C is similar to that of FIGS. 5A through 5D.

FIG. 6A shows the 3D image of the video player screen before a motion event occurs in the electronic device 100.

Referring to FIG. 6B, a layer 1, a layer 2, and a layer 3 for constructing the 3D image of the video player screen are aligned. The 2D image is divided into a button image, a caption image, and a video screen image according to desired perceived distances from an observer of the image. The images are each attributed to a different layer, resulting in a button image layer 1, a caption image layer 2, and a video screen image layer 3.

FIG. 6C shows the 3D video player screen after motion parallax is applied when a user inclines the electronic device 100 toward the right by a predetermined angle. A right region R of the 3D video player screen may become visible to the user of the electronic device 100. Similarly, the electronic device 100 may be inclined upward to view a top region T of the 3D video player screen, downward to view a bottom region B of the 3D video player screen, and toward the left to view a left region L of the 3D video player screen.

Figure 7A:
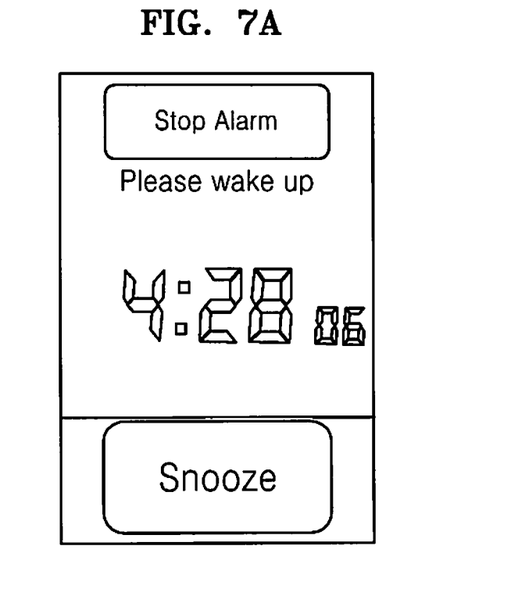
FIG. 7A through 7C are diagrams illustrating a method of displaying a 3D image of a alarm screen using a 2D image in the electronic device of FIG. 1, according to an embodiment of the present invention.
Figure 7B:
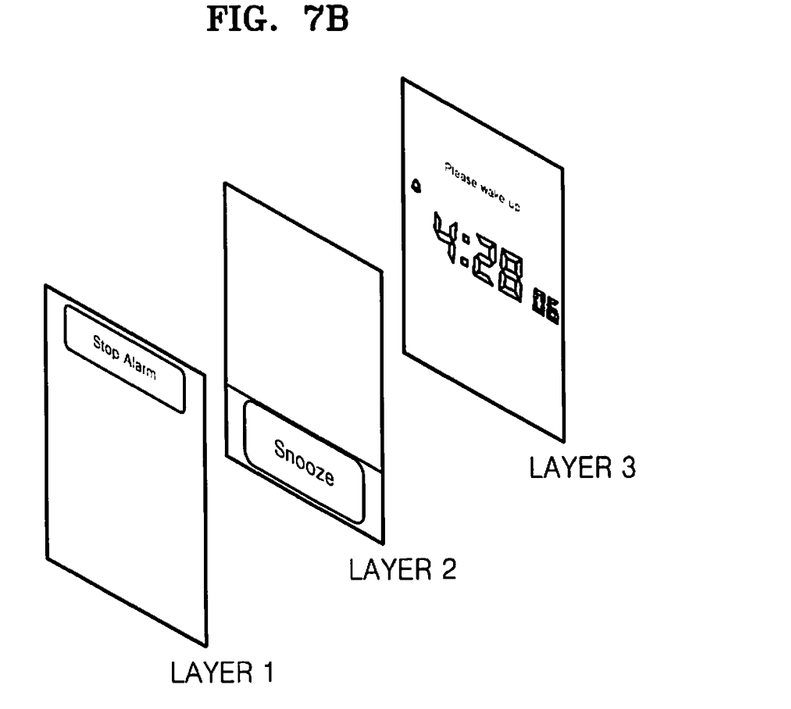
Figure 7C:
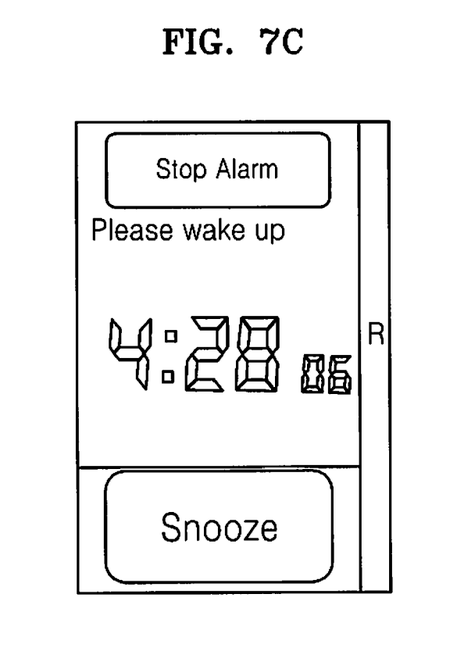

FIG. 7A through 7C are diagrams illustrating a method of constructing a 3D image of an alarm screen using a 2D image in the electronic device 100 of FIG. 1, according to an embodiment of the present invention. The method illustrated in FIGS. 7A through 7C is similar to that of FIGS. 5A through 5D.

FIG. 7A shows the 3D image of the alarm screen before a motion event occurs in the electronic device 100.

Referring to FIG. 7B, a layer 1, a layer 2, and a layer 3 for constructing the 3D alarm screen are aligned. The 2D image is divided into a button image, a clock image, and a background image according to desired perceived distances from an observer of the image. The images are each attributed to a different layer, resulting in a button image layer 1, a clock image layer 2, and a background image layer 3.

FIG. 7C shows the 3D alarm screen after motion parallax is applied when a user inclines the electronic device 100 toward the right by a predetermined angle. A right region R of the 3D alarm screen may become visible to the user of the electronic device 100. Similarly, the electronic device 100 may be inclined upward to view a top region T of the 3D alarm screen, downward to view a bottom region B of the 3D alarm screen, and toward the left to view a left region L of the 3D alarm screen.

Figure 8:
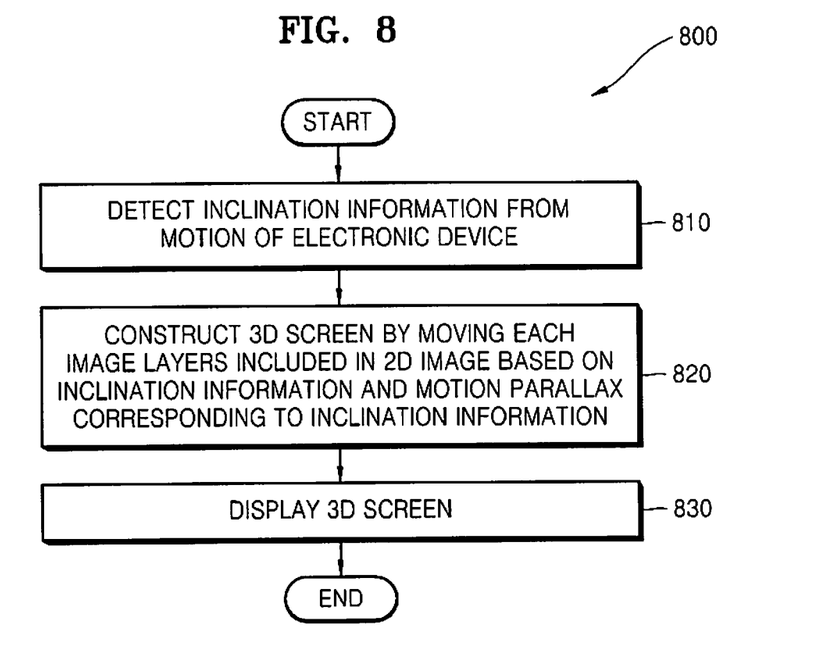
FIG. 8 is a flowchart illustrating a method of displaying a 3D image using a 2D image in the electronic device of FIG. 1, according to an embodiment of the present invention.

FIG. 8 is a flowchart illustrating a method of constructing a 3D image using a 2D image in the electronic device 100 of FIG. 1, according to an embodiment of the present invention.

The method illustrated in FIG. 8 directly relates to the operation of the electronic device 100 described above with respect to FIG. 1.

Referring to FIG. 8, in step 810, the electronic device 100 detects inclination information from a motion of the electronic device 100.

In step 820, the electronic device 100 generates the 3D image by shifting each of a plurality of image layers provided from the 2D image.

In step 830, the electronic device 100 displays the 3D screen.

The present invention can also be implemented as computer-readable code on a computer-readable recording medium. The computer-readable recording medium is any data storage device that can store data, which can be read thereafter by a computer system. Examples of the computer-readable recording medium include Read-Only Memory (ROM), Random-Access Memory (RAM), Compact Disk-ROMs (CD-ROMs), magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the embodiments of the present invention can be easily construed by programmers of ordinary skill in the art to which the embodiments of the present invention pertain.

While the invention has been shown and described with reference to certain embodiments thereof, it will be understood by those skilled in the art that various changes in form and detail may be made therein without departing from the spirit and scope of the invention as defined by the appended claims. The embodiments of the present invention should be regarded in a descriptive sense only and not for purposes of limitation.

What is claimed is:

1. A method of displaying a 3-Dimensional (3D) image using a 2-Dimensional (2D) image in an electronic device, the method comprising the steps of:
    detecting information related to an inclination of the electronic device from a motion of the electronic device;
    generating the 3D image by shifting each of a plurality of image layers, which are derived from the 2D image, by applying motion parallax to each of the plurality of image layers based on the detected information, wherein applying motion parallax comprises setting a different shifting distance for each of the plurality of image layers, where the shifting distance for each of the plurality of images layers is proportional to each image layer's respective perceived distance from an observer; and
    displaying the 3D image,
    wherein generating the 3D image comprises:
        generating a plurality of layers for generation of the 3D image,
        dividing the 2D image into a plurality of sub-images according to respective perceived distances from an observer of the 2D image, and
        generating the plurality of image layers by concurrently displaying the each of the divided sub-images separately on respective ones of the plurality of layers.

2. The method of claim 1, wherein a stationary position of the electronic device is set as a reference coordinate value, and the detected information comprises a distance moved and a direction of rotation of the electronic device from the reference coordinate value in x, y, and z axes.

3. The method of claim 2, wherein generating the 3D image comprises shifting each of the plurality of image layers in a direction opposite that of the rotation of the electronic device.

4. The method of claim 1, wherein generating the 3D image comprises setting a distance that each of the plurality of image layers is shifted in proportion to a difference in perceived distance between an observer and content in each of the plurality of image layers, in order to achieve a 3D effect by applying motion parallax to each of the plurality of image layers.

5. The method of claim 1, wherein generating the 3D image comprises setting a threshold value for a width that each of the plurality of image layers can be shifted.

6. The method of claim 1, wherein the plurality of image layers comprise a menu icon image that is perceived as closest to an observer of the 3D image, a background image that is perceived as farthest from the observer, and a shadow image that is perceived as between the menu icon image and the background image, and
    wherein the 3D image is a menu screen.

7. The method of claim 6, wherein the shadow image is generated by copying and reducing a chroma level of the menu icon image.

8. The method of claim 1, wherein the plurality of image layers comprise a button image that is perceived as closest to an observer of the 3D image, a video screen image that is perceived as farthest from the observer, and a caption image that is perceived as between the button image and the video screen image, and
    wherein the 3D image is a video player screen.

9. The method of claim 1, wherein the plurality of image layers comprise a button image that is perceived as closest to an observer of the 3D screen, a background image that is perceived as farthest from the observer, and a clock image that is perceived as between the button image and the background image, and
    wherein the 3D image is an alarm screen.

10. An electronic device for displaying a 3-Dimensional (3D) image using a 2-Dimensional (2D) image, the electronic device comprising:
    a motion detection unit for detecting information related to an inclination of the electronic device from a motion of the electronic device;
    a processing unit for generating the 3D image by shifting each of a plurality of image layers, which are derived from the 2D image, by applying motion parallax to each of the plurality of image layers based on the detected information, wherein applying motion parallax comprises setting a different shifting distance for each of the plurality of image layers, where the shifting distance for each of the plurality of images layers is proportional to each image layer's respective perceived distance from an observer; and
    a display unit for displaying the 3D image
    wherein generating the 3D image comprises:
        generating a plurality of layers for generation of the 3D image,
        dividing the 2D image into a plurality of sub-images according to
    respective perceived distances from an observer of the 2D image, and
    generating the plurality of image layers by concurrently displaying the each of the divided sub-images separately on respective ones of the plurality of layers.

11. The electronic device of claim 10, wherein the motion detection unit comprises a 3-axis acceleration sensor.

12. The electronic device of claim 10, wherein a stationary position of the electronic device is set as a reference coordinate value, and the detected information comprises a distance moved and a direction of rotation of the electronic device from the reference coordinate value in x, y, and z axes.

13. The electronic device of claim 12, wherein the processing unit is configured to shift each of the plurality of image layers in a direction opposite that of the rotation of the electronic device.

14. The electronic device of claim 10, wherein the processing unit sets a distance that of each of the plurality of image layers is shifted in proportion to a difference in perceived distance between an observer and content in each of the plurality of image layers, in order to achieve a 3D effect by applying motion parallax to each of the plurality of image layers.

15. The electronic device of claim 10, wherein the processing unit sets a threshold value for a width that each of the plurality of image layers can be shifted.

16. The electronic device of claim 10, wherein the plurality of image layers comprise a menu icon image that is perceived as closest to an observer of the 3D image, a background image that is perceived as farthest from the observer, and a shadow image that is perceived as between the menu icon image and the background image, and wherein the 3D image is a menu screen.

17. The electronic device of claim 16, wherein the shadow image is generated by copying and reducing a chroma level of the menu icon image.

18. A non-transitory computer-readable recording medium having recorded thereon a computer program for executing the steps of:

detecting information related to an inclination of an electronic device from a motion of the electronic device;

generating a 3-Dimensional (3D) image by shifting each of a plurality of image layers, which are derived from a 2-Dimensional (2D) image, by applying motion parallax to each of the plurality of image layers the detected information, wherein applying motion parallax comprises setting a different shifting distance for each of the plurality of image layers, where the shifting distance for each of the plurality of images layers is proportional to each image layer's respective perceived distance from an observer; and displaying the 3D image, wherein generating the 3D image comprises:

generating a plurality of layers for generation of the 3D image, dividing the 2D image into a plurality of sub-images according to respective perceived distances from an observer of the 2D image, and generating the plurality of image layers by concurrently displaying the each of the divided sub-images separately on respective ones of the plurality of layers.

* * * * *